(12) United States Patent
Tadepalli et al.

(10) Patent No.: US 7,149,053 B2
(45) Date of Patent: Dec. 12, 2006

(54) DISC DRIVE TURBULENT WIND MANAGEMENT

(75) Inventors: Srinivas Tadepalli, Eden Prairie, MN (US); James H. Smith, Woodside, CA (US); Yiren Hong, Singapore (SG); ChoonKiat Lim, Singapore (SG); Walter Wong, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 508 days.

(21) Appl. No.: 10/176,775

(22) Filed: Jun. 21, 2002

(65) Prior Publication Data

US 2003/0147175 A1 Aug. 7, 2003

Related U.S. Application Data

(60) Provisional application No. 60/355,732, filed on Feb. 7, 2002.

(51) Int. Cl.
*G11B 33/14* (2006.01)
(52) U.S. Cl. .................................................. 360/97.02
(58) Field of Classification Search ............. 360/97.02, 360/97.03, 97.04, 265.1
See application file for complete search history.

(56) References Cited

U.S. PATENT DOCUMENTS

| | | | |
|---|---|---|---|
| 4,652,961 A | 3/1987 | Dieffenbach | 360/133 |
| 4,684,510 A | 8/1987 | Harkins | 423/210 |
| 4,778,719 A | 10/1988 | Jagannathan | 428/323 |
| 4,805,065 A | 2/1989 | Jagannathan et al. | 360/135 |
| 4,885,652 A | 12/1989 | Leonard et al. | 360/133 |
| 4,889,542 A | 12/1989 | Hayes | 55/97 |
| 5,025,337 A | 6/1991 | Brooks | 360/97.03 |
| 5,453,890 A | 9/1995 | Takegami et al. | 360/97.02 |
| 5,490,025 A | 2/1996 | Dorius et al. | 360/103 |
| 5,500,038 A | 3/1996 | Dauber et al. | 96/135 |
| 5,515,214 A | 5/1996 | Kiyonaga et al. | 360/97.02 |
| 5,598,306 A * | 1/1997 | Frees et al. | 360/97.02 |
| 5,602,700 A | 2/1997 | Viskochil et al. | 360/105 |
| 5,696,649 A | 12/1997 | Boutaghou | 360/97.03 |
| 5,850,321 A | 12/1998 | McNeil et al. | 360/106 |
| 5,886,850 A | 3/1999 | Kaczeus et al. | 360/97.01 |
| 6,088,190 A | 7/2000 | Anderson | 360/97.02 |

(Continued)

*Primary Examiner*—Tianjie Chen
(74) *Attorney, Agent, or Firm*—Shumaker & Sieffert, P.A.

(57) ABSTRACT

The disc drive housing encloses a spindle motor carrying a disc having a data surface. An actuator assembly includes an actuator arm carrying a head. The housing includes a first surface portion adjacent to the data surface of the disc. The housing also includes a plurality of surface portions that define a recess, which allows the actuator arm to move over the data surface of the disc. The plurality of surface portions include a sloped surface portion sloping away from the data surface and preventing wind generated by the disc rotating about an axis from separating from the sloped surface portion. Alternatively, a disc drive includes a housing that defines a recess. The housing encloses a disc mounted on a spindle motor that rotates the disc about an axis and thereby generates wind within the housing. An upstream surface portion and a downstream surface portion of the housing both face toward a data surface of the disc. A discontinuity, such as a step, between the upstream surface portion and the downstream surface portion causes a wind recirculation region within the recess. The disc drive also includes an actuator arm that carries a head, which the recess allows to move over the data surface of the disc. An actuator limiting device prevents the actuator arm from entering the wind recirculation region.

22 Claims, 5 Drawing Sheets

U.S. PATENT DOCUMENTS

| | | |
|---|---|---|
| 6,208,484 B1 | 3/2001 | Voights .................... 360/97.02 |
| 6,266,208 B1 * | 7/2001 | Voights .................... 360/97.02 |
| 6,337,782 B1 | 1/2002 | Guerin et al. ............ 360/256.1 |
| 6,459,550 B1 * | 10/2002 | Gillis et al. .............. 360/265.1 |
| 6,501,615 B1 * | 12/2002 | Kelsic et al. ............ 360/97.02 |
| 6,549,365 B1 * | 4/2003 | Severson ................. 360/97.02 |
| 2003/0117746 A1 * | 6/2003 | Kovinskaya et al. ..... 360/97.02 |
| 2003/0156351 A1 * | 8/2003 | Voights et al. ........... 360/97.02 |

* cited by examiner

DISC DRIVE TURBULENT WIND MANAGEMENT

RELATED APPLICATIONS

This application claims priority of U.S. provisional application Ser. No. 60/355,732, filed Feb. 7, 2002.

FIELD OF THE INVENTION

This application relates generally to disc drives and more particularly to a disc drive housing for managing turbulent flow.

BACKGROUND OF THE INVENTION

A typical disc drive includes a base to which various components of the disc drive are mounted. A top cover cooperates with the base to form a housing that defines an internal, sealed environment for the disc drive. The components include a spindle motor, which rotates one or more discs at a high speed. Information is written to and read from tracks on the discs through the use of an actuator assembly, which rotates during a seek operation about a bearing shaft assembly positioned adjacent the discs. The actuator assembly includes at least one actuator arm, which extends towards the discs, with one or more flexures extending from each of the actuator arms. Mounted at the distal end of each of the flexures is a head, which includes an air bearing slider enabling the head to fly in close proximity above the corresponding surface of the associated disc.

Particles in the disc drive have an adverse effect on drive reliability. Of particular concern are airborne particles that enter the head-disc interface. These particles can scratch the disc surface or become embedded in the disc, leading to catastrophic failures and/or irrecoverable data loss. Additionally, particles under the slider can damage the sensitive head transducer and possibly prevent any further read/write operations of the disc drive.

Additionally, vibrations in the disc drive can have an adverse effect on drive reliability by creating unpredicted movement between the head and the disc. Such unpredicted movement can cause read/write errors. Such movement also prevents narrower tracks from being used in disc drives, and thus limits the memory capability of the disc drive.

Accordingly there is a need for a disc drive that reduces the number of particles entering the head/disc interface and that decreases the vibrations in the disc drive. The present invention provides a solution to this and other problems, and offers other advantages over the prior art.

SUMMARY OF THE INVENTION

Against this backdrop the present invention has been developed. One embodiment of the invention utilizes sloped surfaces to reduce turbulent flow within the disc drive. Another embodiment limits movement of an actuator arm of the disc drive to prevent it from entering a recirculation or turbulent flow region.

Accordingly, one embodiment of the invention is a disc drive that includes a housing. The housing encloses a spindle motor carrying a disc having a data surface. An actuator assembly includes an actuator arm carrying a head, such as a head for reading to and writing from the disc. The housing includes a first surface portion adjacent to the data surface of the disc. The housing also includes a plurality of surface portions that define a recess, which allows the actuator arm to move over the data surface of the disc. The plurality of surface portions include a sloped surface portion sloping away from the data surface and preventing wind generated by the disc rotating about an axis from separating from the sloped surface portion.

In an alternative embodiment of the invention, a disc drive includes a housing that defines a recess. The housing encloses a disc mounted on a spindle motor that rotates the disc about an axis and thereby generates wind within the housing. An upstream surface portion and a downstream surface portion of the housing both face toward a data surface of the disc. A discontinuity, such as a step, between the upstream surface portion and the downstream surface portion causes a wind recirculation region within the recess. The disc drive also includes an actuator arm that carries a head, which the recess allows to move over the data surface of the disc. An actuator limiting device prevents the actuator arm from entering the wind recirculation region.

These and various other features as well as advantages which characterize the present invention will be apparent from a reading of the following detailed description and a review of the associated drawings.

DETAILED DESCRIPTION

Figure 1:
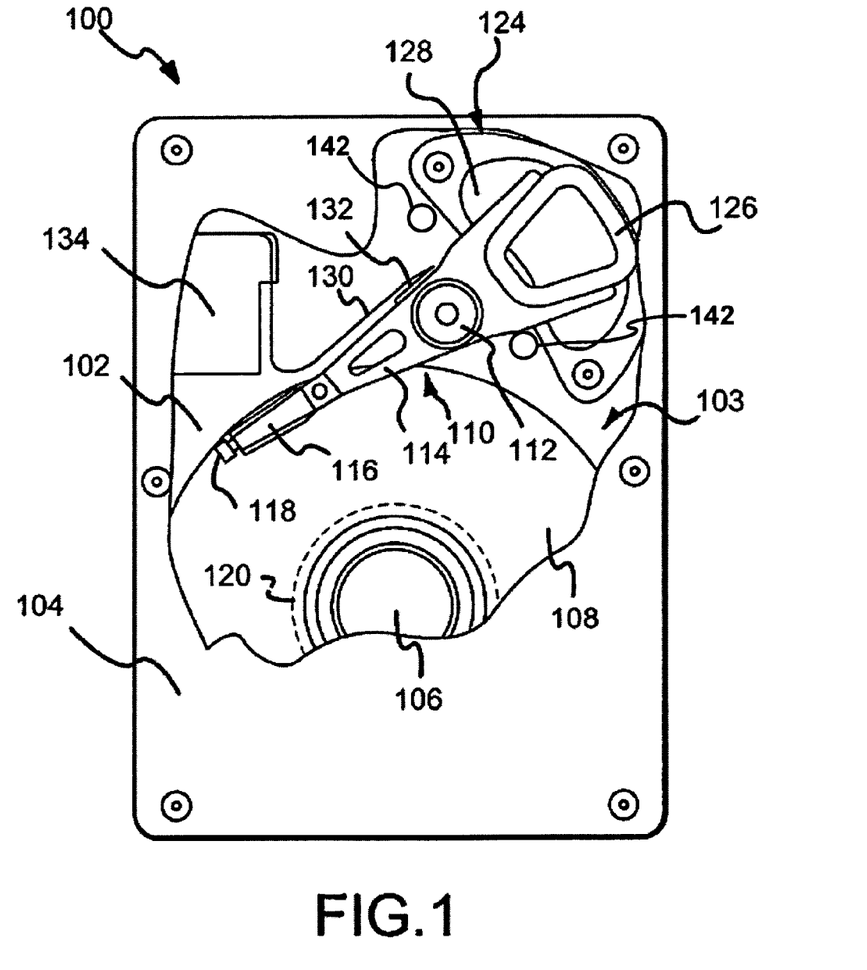
FIG. 1 is a plan view of a disc drive showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form a housing 103 that defines an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Orientational terms such as up, down, lower, and higher are used herein to describe the relative orientation of structural elements of the disc drive 100, and are not meant to limit the present invention to any particular orientation of the disc drive itself.

Figure 2:
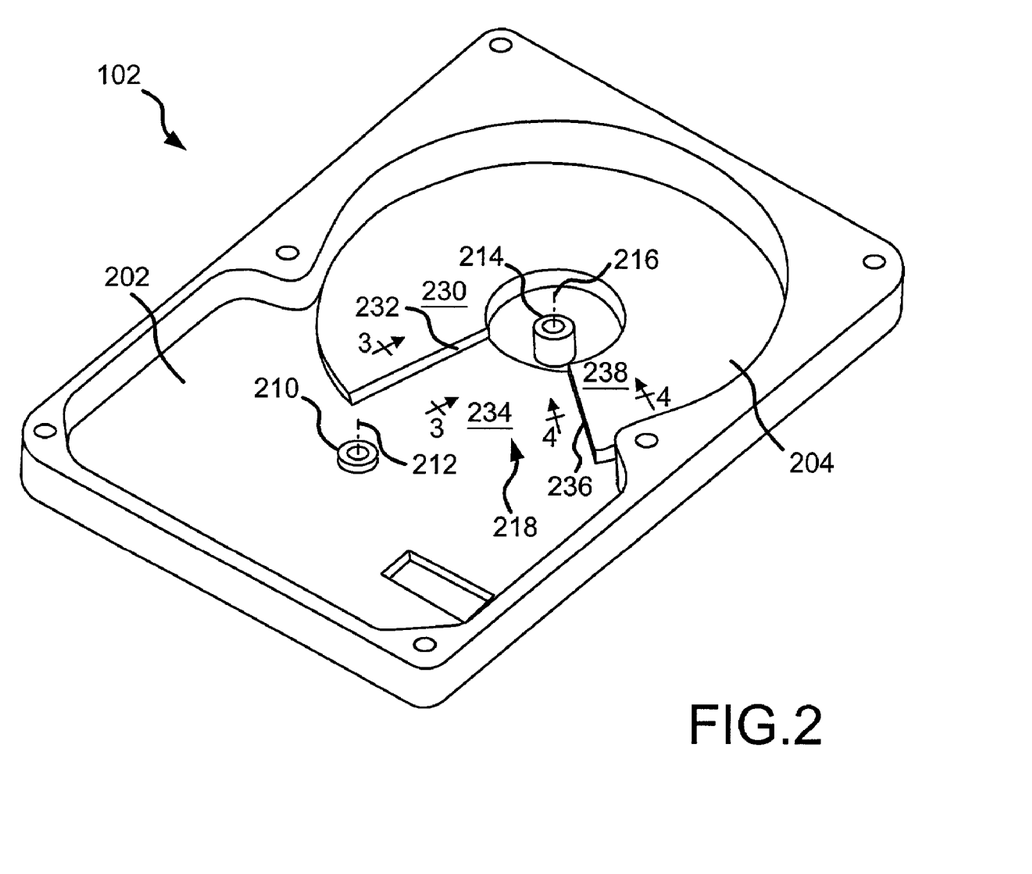
FIG. 2 is a perspective view of a base plate of a disc drive according to an embodiment of the present invention.

Referring now to FIG. 2, a generally rectangular base plate 102 defines a generally rectangular actuator assembly region 202 that opens to a generally circular disc region 204. An actuator mounting boss 210 is centrally located in the floor of the actuator assembly region 202. The actuator assembly 110 shown in FIG. 1 is mounted to the actuator boss 210. The actuator assembly 110 is then able to pivot about an actuator axis 212 in performing seek operations as discussed above. The base plate 102 also includes a spindle motor mounting boss 214 that is centrally located in the floor of the disc region 204. The spindle motor 106 shown in FIG. 1 is mounted to the mounting boss 214. The spindle motor 106 rotates the discs 108 in a counterclockwise direction about he spindle axis 216 as viewed in FIGS. 1 and 2.

The base plate 102 also defines a recess 218 that allows an actuator arm 114 to rotate under a lower data surface 302 (see FIGS. 3-4) of the bottom disc 108 on the spindle motor 106 in the disc drive 100. An upstream surface portion 230 of the base plate 102 is below and preferably substantially parallel to the discs 108. The upstream surface portion 230 terminates at a discontinuity or step down 232, which defines one side of the recess 218. A first downstream surface portion or floor surface portion 234 then continues from the step down 232 to define a floor of the recess 218. The floor surface portion 234 is preferably parallel to, but axially offset downwardly from, the upstream surface portion 230. The floor surface portion 234 extends to a step up or discontinuity 236, which extends axially to a second downstream surface portion 238. The second downstream surface portion 238 is preferably parallel to the upstream surface portion 230 and the floor surface portion 234. The second downstream surface portion 238 is axially offset upwardly from the floor surface portion 234, but substantially coplanar with the upstream surface portion 230. The second downstream surface portion 238 preferably extends circumferentially to the upstream surface portion 230 so that the second downstream surface portion 238 and the upstream surface portion 230 form a continuous arcuate surface portion. The discontinuities 232 and 236 are preferably vertical radially extending walls beneath the lower data surface 302 of the lowest disc 108. The discontinuities 232 and 236 could be sloped, rather than vertical, so long as they create recirculation regions within the recess 218.

A disc 108 rotates over the base plate 102 above the surface portions 230, 232, 234, 236, and 238. The spinning disc 108 creates a wind that flows in a substantially circumferential counterclockwise direction relative to the spindle axis 216, although the wind likely also has a radial component. The wind thus flows along the upstream surface portion 230, over the step down 232, along the floor surface portion 234, over the step up 236, and along the second downstream surface portion 238. The wind then flows in a substantially circumferential path back to the upstream surface portion 230.

Figure 3:
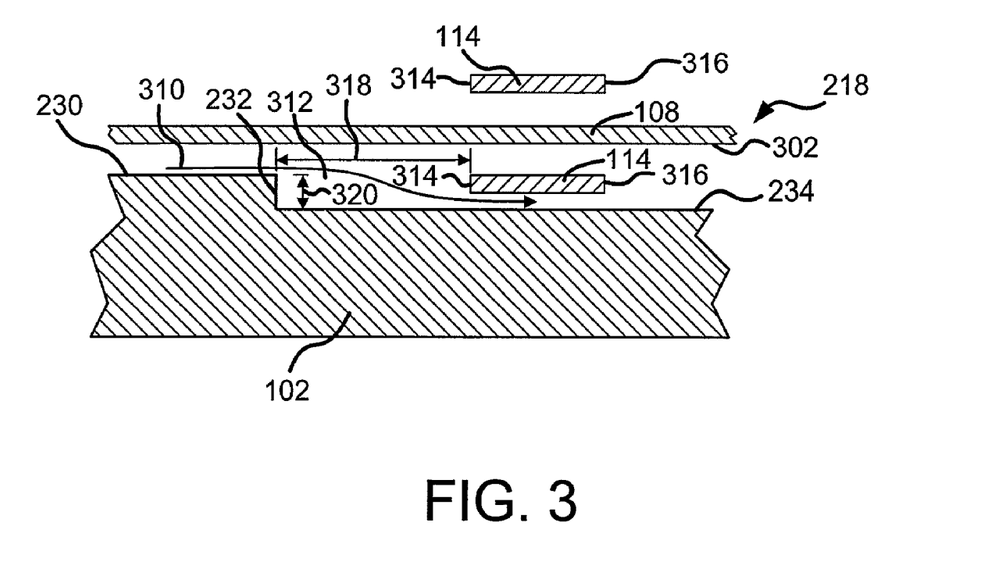
FIG. 3 is a sectional view taken along line 3—3 of FIG. 2, additionally illustrating actuator arms as would be used with the base plate and the direction of wind along the base plate.

Referring now to FIG. 3, as the wind flows circumferentially below the lower data surface 302 of the lowest disc 108 along the wind direction 310 from the upstream surface portion 230 over the step down 232, the wind separates from the surface of the base plate 102. More specifically, the wind separates from the step down 232 and remains separated from the floor surface portion 234, thereby creating a step down recirculation region or separation region 312. The flow of the wind in the step down recirculation region 312 is turbulent. It is believed that this turbulent wind flow tends to distribute particles within the recirculation region 312 and to cause increased vibrations of members within the recirculation region 312. However, it is also believed that downstream from the recirculation region 312, the wind flow attaches to the floor surface portion 234 and again becomes laminar. The actuator arms 114 and the heads 118 mounted on the actuator arms 114 are located downstream from the recirculation region 312, and are prevented from pivoting into the recirculation region 312 by a limiting device, which may be, e.g., software of the actuator control system or crash stops 142. Accordingly, the effects of the increased vibrations caused by the recirculation region 312 are minimized for the arms 114 and the heads 118, thereby decreasing vibrations in the arms 114 and the heads 118. Additionally, the particle deposition effects of the recirculation region 312 are minimized, thereby decreasing the probability of particles entering the lowest head-disc interface.

More particularly, the arms 114 each include an upstream side edge 314 facing the step down 232 and an opposing downstream side edge 316. In a preferred embodiment, a distance 318 between the step down 232 and the upstream edge 314 of the actuator arms 114 is at least six times the axial offset distance between the upstream surface portion 230 and the floor surface portion 234, or in other words the step height 320. In a more preferred embodiment, the distance 318 is at least 6.2 times the step height 320.

Figure 4:
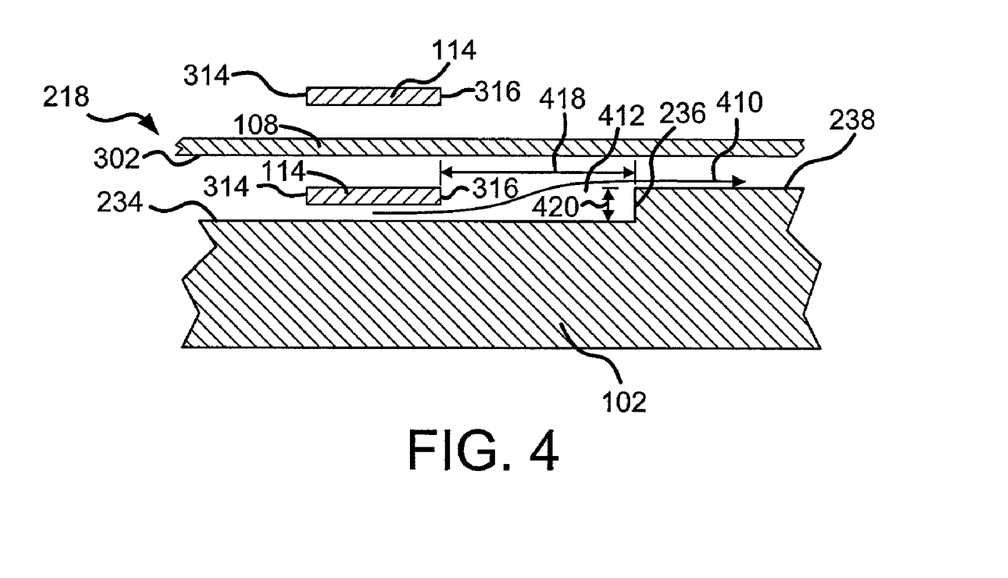
FIG. 4 is a sectional view taken along line 4—4 of FIG. 2, additionally illustrating actuator arms as would be used with the base plate and the direction of wind along the base plate.

Referring now to FIG. 4, as the wind flows circumferentially along the wind direction 410 below the lower surface 302 of the lowest disc 108 from the floor surface portion 234 over the step up 236, the wind again separates from the surface of the base plate 102. More specifically, the wind separates from the floor surface portion 234 and remains separated as it flows upwardly and over the step up 236, thereby creating a step up recirculation region or separation region 412. As with the step down recirculation region 312, the step up recirculation region 412 is turbulent, and is believed to cause the same problems as the step down recirculation region 312. However, it is believed that upstream of the recirculation region 412, the wind flow remains attached to the floor surface portion 234 and thus remains laminar until separation from the floor surface portion 234. The actuator arms 114 and the heads 118 mounted on the actuator arms 114 are located upstream of the recirculation region 412, and are prevented from pivoting into the recirculation region 312 by a limiting device, which may be, e.g., software of the actuator control system or crash stops 142. Accordingly, the effects of the increased vibrations caused by the recirculation region 412 are minimized for the arms 114 and the heads 118, thereby decreasing vibrations in the arms 114 and the heads 118. Additionally, the particle deposition effects of the recirculation region 412 are minimized, thereby decreasing the probability of particles entering the lowest head-disc interface.

In a preferred embodiment, a distance 418 between the step up 236 and the downstream edge 316 of the actuator arms 114 is at least six times the axial offset distance between the second downstream surface portion 238 and the floor surface portion 234, or in other words the step height 420. In a more preferred embodiment, the distance 418 is at least 6.2 times the step height 420.

The recirculation regions 312, 412 can be determined using flow simulation software, such as the software marketed under the trademark FLUENT by Fluent, Inc. located in Lebanon, N.H. These determinations can be verified by performing standard computations for flow over a backward facing step and flow over a forward facing step.

Figure 5:
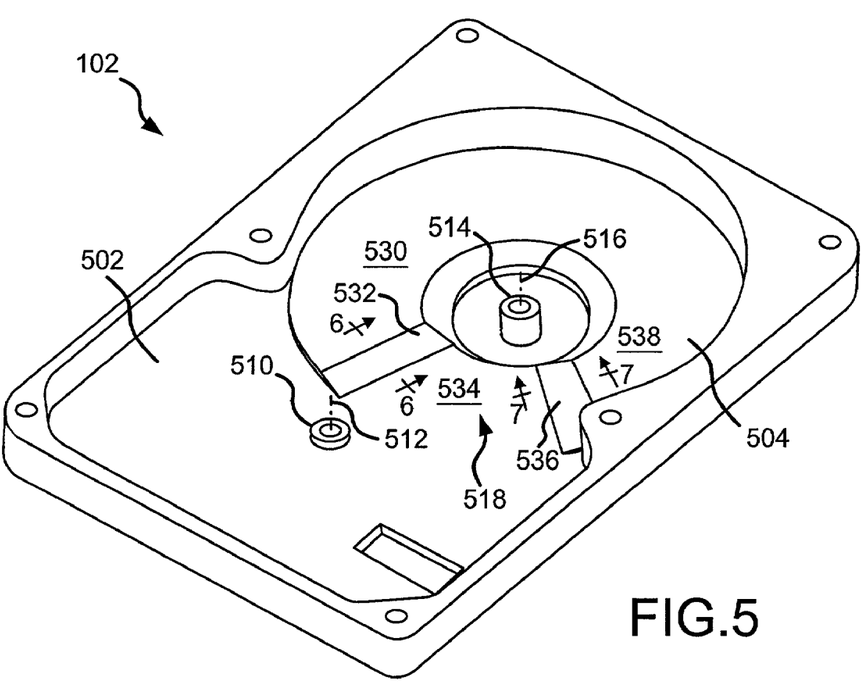
FIG. 5 is a perspective view of a base plate of a disc drive according to an alternative embodiment of the present invention.

Referring now to FIG. 5, a generally rectangular base plate 102 defines a generally rectangular actuator assembly region 502 that opens to a generally circular disc region 504. An actuator mounting boss 510 is centrally located in the floor of the actuator assembly region 502. The actuator assembly 110 shown in FIG. 1 is mounted to the actuator mounting boss 510. The actuator assembly 110 is then able to pivot about an actuator axis 512 in performing seek operations as discussed above. The base plate 102 also includes a spindle motor mounting boss 514 that is centrally located in the disc region 504. The spindle motor 106 shown in FIG. 1 is mounted to the mounting boss 514. The spindle motor 106 rotates the discs 108 in a counterclockwise direction about a spindle axis 516 as viewed in FIG. 5.

The base plate 102 also defines a recess 518 that allows an actuator arm 114 to rotate under the lower data surface of the bottom disc 108 on the spindle motor 106 in the disc drive 100. An upstream surface portion 530 of the base plate 102 is below and preferably substantially parallel to the discs 108. The upstream surface portion 530 terminates at a slope down surface portion or ramp 532, which defines one side of the recess 518.

A first downstream surface portion or floor surface portion 534 then continues from the slope down surface portion 532 to define a floor of the recess 518. The floor surface portion 534 is preferably parallel to, but axially offset downwardly from, the upstream surface portion 530. The floor surface portion 534 extends to a slope up surface portion or ramp 536. The slope up surface portion 536 slopes to a second downstream surface portion 538.

The second downstream surface portion 538 is preferably parallel to the upstream surface portion 530 and the floor surface portion 534. The second downstream surface portion 538 is preferably axially offset upwardly from the floor surface portion 534, but substantially coplanar with the upstream surface portion 530. The second downstream surface portion 538 preferably extends circumferentially to the upstream surface portion 530 so that the second downstream surface portion 538 and the upstream surface portion 530 form a continuous arcuate surface portion.

As a disc 108 rotates over the base plate 102, above the surface portions 530, 532, 534, 536, and 538, the spinning disc creates a wind that flows in a substantially circumferential counterclockwise direction, although the wind likely also has a radial component. The wind thus flows along the upstream surface portion 530, along the slope down surface portion 532, along the floor surface portion 534, along the slope up surface portion 536, and along the second downstream surface portion 538. The wind then flows in a substantially circumferential path back to the upstream surface portion 530.

Figure 6:
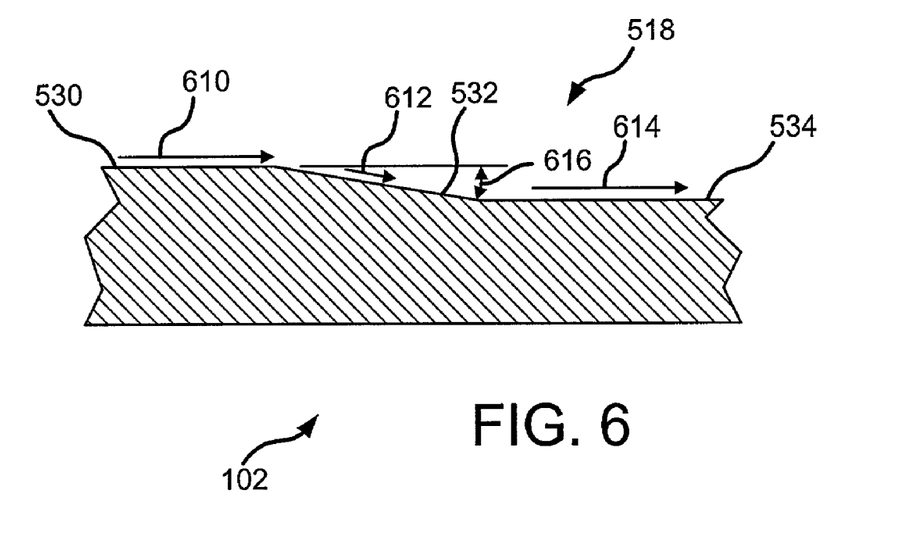
FIG. 6 is a sectional view taken along line 6—6 of FIG. 5, additionally illustrating the direction of wind along the base plate.

Referring now to FIG. 6, the wind flows substantially circumferentially about the spindle axis 516 of FIG. 5 in an upstream wind direction 610 along the upstream surface portion 530, in a slope down wind direction 612 along the slope down surface portion 532 and in a first downstream wind direction 614 along the floor surface portion 534. Prior disc drives included slope down surfaces that were either substantially normal to the upstream surface portion, as shown in FIG. 3, or that had large slope angles relative to the corresponding upstream surface portions. It is believed that the large slope angles cause flow separation and attendant turbulent flow.

In the embodiment of the present invention illustrated in FIG. 6, a slope angle 616 of the slope down surface portion 532 relative to the upstream surface portion 530 in a circumferential direction about the spindle axis 516 is small enough to prevent the wind from separating from the slope down surface portion 532. Thus, the slope down surface portion 532, having a sufficiently small slope angle 616, spans the discontinuity between the upstream surface portion 530 and the floor surface portion 534 and thereby prevents flow separation and the attendant turbulent flow in the resulting recirculation region. Accordingly, the effects of the increased vibrations that would be caused by a recirculation region are minimized for the arms 114 and the heads 118 within the recess 518, thereby decreasing vibrations in the arms 114 and the heads 118. Additionally, the particle deposition effects of the recirculation region are avoided by preventing the formation of a recirculation region. Accordingly, the slope down surface portion 532 decreases the probability of particles entering the lowest head-disc interface.

More particularly, in a preferred embodiment, the slope angle 616 is less than about thirty degrees. More preferably, the slope angle 616 is from about ten degrees to about thirty degrees, and most preferably the slope angle 616 is about twelve degrees.

Figure 7:
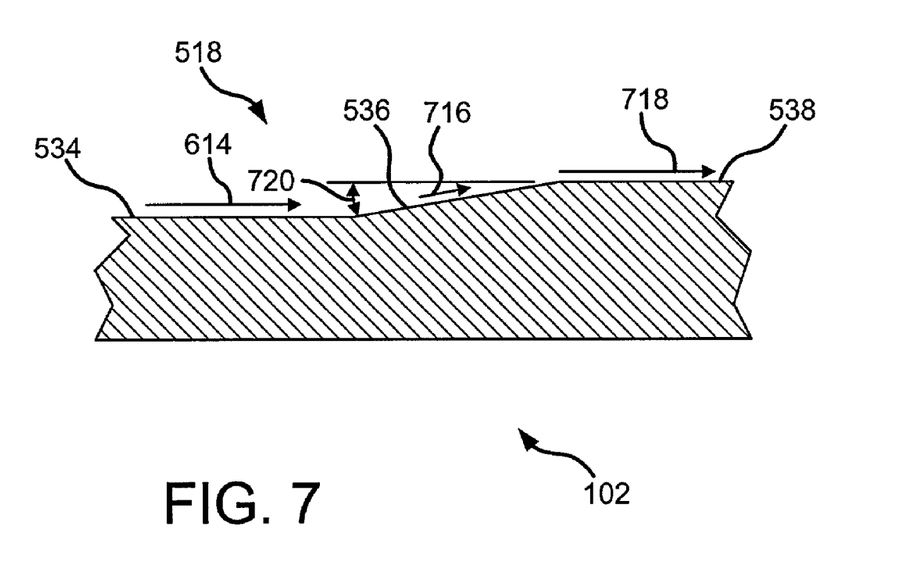
FIG. 7 is a sectional view taken along line 7—7 of FIG. 5, additionally illustrating the direction of wind along the base plate.

Referring now to FIG. 7, the wind flows circumferentially about the spindle axis 516 of FIG. 5 in the first downstream wind direction 614 along the first downstream surface portion 534, in a slope up wind direction 716 along the slope up surface portion 536, and in a second downstream wind direction 718 along the second downstream surface portion 538. Prior disc drives included slope up surfaces that were either substantially normal to the floor surface portion, as shown in FIG. 4, or that had slope angles relative to the upstream surface portion which were large enough to cause flow separation and attendant turbulent flow.

In the embodiment of the present invention illustrated in FIG. 7, a slope angle 720 of the slope up surface portion 536 relative to the second downstream surface portion 538 in a circumferential direction about the spindle axis 516 is small enough to prevent the wind from separating from the slope up surface portion 536. Thus, the slope up surface portion 536, having a sufficiently small slope angle 720, spans the discontinuity between the floor surface portion 534 and the second downstream surface portion 538 and thereby prevents flow separation and the attendant turbulent flow in the resulting recirculation region. Accordingly, the effects of the increased vibrations that would be caused by a recirculation region are minimized for the arms 114 and the heads 118 within the recess 518, thereby decreasing vibrations in the arms 114 and the heads 118. Additionally, the particle deposition effects of the recirculation region are avoided by preventing the formation of a recirculation region. Accordingly, the slope up surface portion 536 decreases the probability of particles entering the lowest head-disc interface.

More particularly, in a preferred embodiment, the slope angle 720 is less than about thirty degrees. More preferably, the slope angle 720 is from about ten degrees to about thirty degrees, and most preferably the slope angle 720 is about twelve degrees.

The slope down surface portion 532 and the slope up surface portion 536 may be curved, rather than planar, surface portions. In this case, the respective slope angles 616, 720 are maximum angles of the surface portions 532, 536 relative to the adjacent surface portions 530, 538.

In an embodiment of a disc drive 100 including the slope down surface portion 532 and the slope up surface portion 536, the position error signal, including both non-repeatable runout and repeatable runout components, decreased by 0.1 micro-inch compared to disc drives with slope angles large enough to cause flow separation. As discussed above, it is believed that this decrease is due to the absence of flow separation in the step down and step up regions at the borders of the recess 518.

An embodiment of the invention may be alternatively described as a disc drive (such as 100) that includes a housing (such as 103). The housing encloses a spindle motor (such as 106) carrying a disc (such as 108) having a data surface (such as 302). An actuator assembly (such as 110) includes an actuator arm (such as 114) carrying a head (such as 118). The housing includes a first surface portion (such as 530 or 538) adjacent to the data surface of the disc. The housing also includes a plurality of surface portions (such as 532, 534, and 536) that define a recess (such as 518), which allows the actuator arm to move over the data surface of the disc. The plurality of surface portions include a sloped surface portion (such as 532 or 536) sloping away from the data surface and preventing wind generated by the disc rotating about an axis (such as 516) from separating from the sloped surface portion.

In one embodiment, the first surface portion (such as 530) faces upwardly and is upstream of the actuator arm. In that embodiment, the sloped surface portion (such as 532) slopes downwardly from the first surface portion. The housing may further include a second upwardly facing surface portion (such as 538) downstream from and adjacent to the recess. In that case, the plurality of surface portions additionally includes a second sloped surface portion (such as 536) downstream from the first aforesaid sloped surface portion. The second sloped surface portion slopes away from the data surface and prevents wind generated by the disc rotating about the axis from separating from the sloped surface portion. The plurality of surface portions may also include an upwardly facing floor surface portion (such as 534) between the first sloped surface portion and the second sloped surface portion. Preferably, the first upwardly facing surface portion, the second upwardly facing surface portion, and the plurality of surface portions together form an annular surface portion beneath the disc.

The first surface portion is preferably substantially parallel to the data surface of the disc. A slope angle (such as 616 or 720) of the sloped surface portion relative to the first surface portion in a circumferential direction about the axis is preferably from about ten degrees to about thirty degrees, and more preferably about twelve degrees.

The plurality of surface portions may be portions of a surface of a base plate (such as 102) of the housing or they may be portions of a surface of a cover (such as 104) of the housing.

An embodiment of the invention may be alternatively described as a disc drive (such as 100) that includes a housing (such as 103) that defines a recess (such as 218). The housing encloses a disc (such as 108) mounted on a spindle motor (such as 106) that rotates the disc about an axis (such as 216) and thereby generates wind within the housing. An upstream surface portion (such as 230 or 234) and a downstream surface portion (such as 234 or 238) of the housing both face toward a data surface (such as 302) of the disc (such as 108). A discontinuity (such as 232 or 236) between the upstream surface portion and the downstream surface portion causes a wind recirculation region (such as 312 or 412) within the recess. The disc drive also includes an actuator arm (such as 114) that carries a head (such as 118), which the recess allows to move over the data surface of the disc. An actuator limiting device prevents the actuator arm from entering the wind recirculation region.

Preferably, the actuator limiting device maintains a distance (such as 318 or 418) between the actuator arm and the discontinuity that is at least six times an axial displacement distance (such as 320 or 420) between the upstream surface portion and the downstream surface portion. The discontinuity may be a step between the upstream surface portion and the downstream surface portion.

The housing may include a cover (such as 104) and a base plate (such as 102), and the upstream surface portion, the downstream surface portion, and the discontinuity may all be surface portions of the base plate.

In one embodiment, the downstream surface portion (such as 234) is axially lower than the upstream surface portion (such as 230) and the actuator arm is downstream from the wind recirculation region (such as 312). In that case, the housing may further include a second downstream surface portion (such as 238) downstream from the first aforesaid downstream surface portion, the second downstream surface portion being higher than the first downstream surface portion. A second discontinuity (such as 236) between the first downstream surface portion and the second downstream surface portion causes a second wind recirculation region (such as 412) within the recess. In that case, the actuator arm is upstream from the second wind recirculation region.

Additionally, an embodiment of the invention may be alternatively described as a disc drive (such as 100) that includes a housing (such as 103) enclosing a spindle motor (such as 106) and an actuator arm (such as 114) supporting a head (such as 118). The spindle motor rotates a disc (such as 108) about an axis (such as 516) and thereby produces a wind that flows over a first surface portion (such as 530 or 538) of the housing. The housing includes a recess (such as 518) adjacent the first surface portion, the recess allowing the actuator arm to access the disc, and the recess being defined by a plurality of surface portions (such as 532, 534, and 536). The housing also includes means for providing a smooth transition between the first surface portion and the plurality of surface portions and for preventing the wind from separating from the plurality of surface portions.

The means for providing a smooth transition may include a sloped surface portion (such as 532 or 536) of the plurality of surface portions, such that the sloped surface portion prevents the wind from separating from the sloped surface portion.

It will be clear that the present invention is well adapted to attain the ends and advantages mentioned as well as those inherent therein. While embodiments have been described for purposes of this disclosure, various changes and modifications may be made which are well within the scope of the present invention. For example, the recess and the surface portions discussed above could be formed in the cover of the disc drive rather than, or in addition to, the base plate. Additionally, a base plate or cover could include a combination of steps as disclosed in FIGS. 2–4 and sloped surface portions as disclosed in FIGS. 5–7, rather than having all sloped surfaces or all steps. Numerous other changes may be made which will readily suggest themselves to those skilled in the art and which are encompassed in the scope of the invention disclosed and as defined in the appended claims.

What is claimed is:

1. A disc drive comprising a housing enclosing a spindle motor carrying a disc having a data surface, and an actuator assembly adjacent the disc, the actuator assembly comprising an actuator arm carrying a head, the housing comprising:
   a first surface portion of the housing adjacent to the data surface of the disc; and
   a plurality of surface portions of the housing defining a recess, the recess allowing the actuator arm to move over the data surface of the disc, the plurality of surface portions comprising a sloped surface portion sloping away from the data surface and preventing wind generated by the disc rotating about an axis from separating from the sloped surface portion.

2. The disc drive of claim 1, wherein the first surface portion faces upwardly and is upstream of the actuator arm and wherein the sloped surface portion slopes downwardly from the first surface portion.

3. The disc drive of claim 2, wherein:
   the housing further comprises a second upwardly facing surface portion downstream from and adjacent to the recess; and
   the plurality of surface portions further comprises a second sloped surface portion downstream from the first aforesaid sloped surface portion, the second sloped surface portion sloping away from the data surface and preventing wind generated by the disc rotating about the axis from separating from the sloped surface portion.

4. The disc drive of claim 3, wherein the plurality of surface portions further comprises an upwardly facing floor surface portion between the first sloped surface portion and the second sloped surface portion.

5. The disc drive of claim 3, wherein the first upwardly facing surface portion, the second upwardly facing surface portion, and the plurality of surface portions together form an annular surface portion beneath the disc.

6. The disc drive of claim 1, wherein the first surface portion is substantially parallel to the data surface of the disc, and wherein a slope angle of the sloped surface portion relative to the first surface portion in a circumferential direction about the axis is from about ten degrees to about thirty degrees.

7. The disc drive of claim 6, wherein the slope angle is about twelve degrees.

8. The disc drive of claim 1, wherein the first surface portion and the plurality of surface portions are portions of a surface of a base plate of the housing.

9. The disc drive of claim 1, wherein the first surface portion and the plurality of surface portions are portions of a surface of a cover of the housing.

10. A disc drive comprising:
    a housing enclosing a disc mounted on a spindle motor, the housing defining a recess and the spindle motor being effective to rotate the disc about an axis and thereby generate wind within the housing;
    an upstream surface portion of the housing facing toward a data surface of the disc;
    a downstream surface portion of the housing facing toward the data surface of the disc, the downstream surface portion being downstream from the upstream surface portion; and
    a discontinuity between the upstream surface portion and the downstream surface portion, the discontinuity causing a wind recirculation region within the recess;
    an actuator arm carrying a head, the recess allowing the head to move over the data surface of the disc; and
    an actuator limiting device, the actuator limiting device preventing the actuator arm from pivoting or rotating into the wind recirculation region.

11. The disc drive of claim 10, wherein the actuator limiting device maintains a radial distance between the actuator arm and the discontinuity that is at least six times an axial displacement distance between the upstream surface portion and the downstream surface portion.

12. The disc drive of claim 10, wherein the discontinuity is a sloped surface between the upstream surface portion and the downstream portion.

13. The disc drive of claim 10, wherein the housing comprises a cover and a baseplate, and wherein the upstream surface portion, the downstream surface portion, and the discontinuity are all surface portions of the base plate.

14. The disc drive of claim 10, wherein:
    the disc is above the upstream surface portion and the downstream surface portion;
    the downstream surface portion is axially lower than the upstream surface portion; and
    the actuator arm is downstream from the wind recirculation region.

15. The disc drive of claim 14, wherein the housing further comprises:
    a second downstream surface portion downstream from the first aforesaid downstream surface portion, the second downstream surface portion being higher than the first downstream surface portion; and
    a second discontinuity between the first downstream surface portion and the second downstream surface portion, the second discontinuity causing a second wind recirculation region within the recess;
    wherein the actuator arm is upstream from the second wind recirculation region.

16. The disc drive of claim 10, wherein the actuator limiting device comprises software of the actuator control system.

17. The disc drive of claim 10, wherein the actuator limiting device is operably connected to the actuator arm.

18. The disc drive of claim 10, wherein the actuator limiting device comprises crash stops.

19. A disc drive comprising a housing enclosing a spindle motor and an actuator having an actuator arm supporting a head, the spindle motor operable to rotate a disc about an axis and thereby produce a wind that travels over a first surface portion of the housing, the housing comprising:
   a recess adjacent the first surface portion, the recess allowing the actuator arm to access the disc, and the recess being defined by a plurality of surface portions; and
   means for providing a smooth transition between the first surface portion and the plurality of surface portions and for preventing the wind from separating from the plurality of surface portions.

20. The disc drive of claim 19, wherein the means for providing a smooth transition comprises a sloped surface portion of the plurality of surface portions and wherein a sloped angle between the sloped surface portion and the first surface portion in a circumferential direction about the axis is sufficiently small to prevent the wind from separating from the sloped surface portion.

21. The disc drive of claim 17, wherein:
   the housing further comprises a second upwardly facing surface portion downstream from and adjacent to the recess; and
   the plurality of surface portions further comprises a second sloped surface portion downstream from the first aforesaid sloped surface portion, the second sloped surface portion having a second sloped angle relative to the second upwardly facing surface portion in a circumferential direction about the axis, the second slope angle being sufficiently small to prevent the wind from separating from the second sloped surface portion.

22. The disc drive of claim 20, wherein the sloped angle is from about ten degrees to about thirty degrees.

* * * * *